Aug. 10, 1954

R. E. MOULE 2,686,109

GELATIN MELTER

Filed Jan. 6, 1950

INVENTOR
REX E. MOULE
BY George C. Crompton Jr.
ATTORNEY

Aug. 10, 1954

R. E. MOULE 2,686,109

GELATIN MELTER

Filed Jan. 6, 1950

INVENTOR
REX E. MOULE

BY George C. [signature]

ATTORNEY

Aug. 10, 1954          R. E. MOULE                2,686,109
                      GELATIN MELTER
Filed Jan. 6, 1950                              4 Sheets-Sheet 3

INVENTOR
REX E. MOULE
BY
George C. Humphrey
ATTORNEY

Aug. 10, 1954    R. E. MOULE    2,686,109
GELATIN MELTER

Filed Jan. 6, 1950

INVENTOR
REX E. MOULE

BY
George C. Hampton Jr.
ATTORNEY

Patented Aug. 10, 1954

2,686,109

UNITED STATES PATENT OFFICE 2,686,109

GELATIN MELTER

Rex E. Moule, Holden, Mass., assignor to Norton Company, Worcester, Mass., a corporation of Massachusetts Application January 6, 1950, Serial No. 137,152

3 Claims. (Cl. 23—280)

The invention relates to an apparatus for melting gelatin and the like and with regard to its more specific features especially for use in or with encapsulating machines.

One object of the invention is to provide apparatus for quickly melting gelatin for delivery to encapsulating machines. Another object of the invention is to hydrolyze the gelatin quickly. Another object is to reduce the gel strength of the gelatin. Another object is to increase the adhesiveness of the gelatin to the desired point. Another object of the invention is to attain the optimum gel strength for satisfactory encapsulating with greater accuracy than was hitherto possible.

Another object of the invention is to rid the melting and molten gelatin of entrapped air as completely as possible in the shortest period of time. Another object of the invention is to remove air from between particles of gelatin prior to or coincident with the melting thereof to avoid the entrapment of air in the liquid.

Another object of the invention is to provide rugged and dependable apparatus for melting and ageing gelatin. Another object of the invention is to provide apparatus of the type indicated which gives accurate control of the temperature in the various parts thereof. Another object of the invention is to provide gelatin melting apparatus which is compact and self-contained, avoiding steam pipe connections and the like. Another object of the invention is to provide a gelatin receiver provided with a heater to keep the gelatin hot which is movable from place to place like a small hand truck.

Other objects will be in part obvious or in part pointed out hereinafter.

In the accompanying drawings illustrating several of many possible embodiments of the mechanical features of this invention, Figure 1 is a vertical sectional view showing both the gelatin melter and the gelatin receiver.

Figure 1:
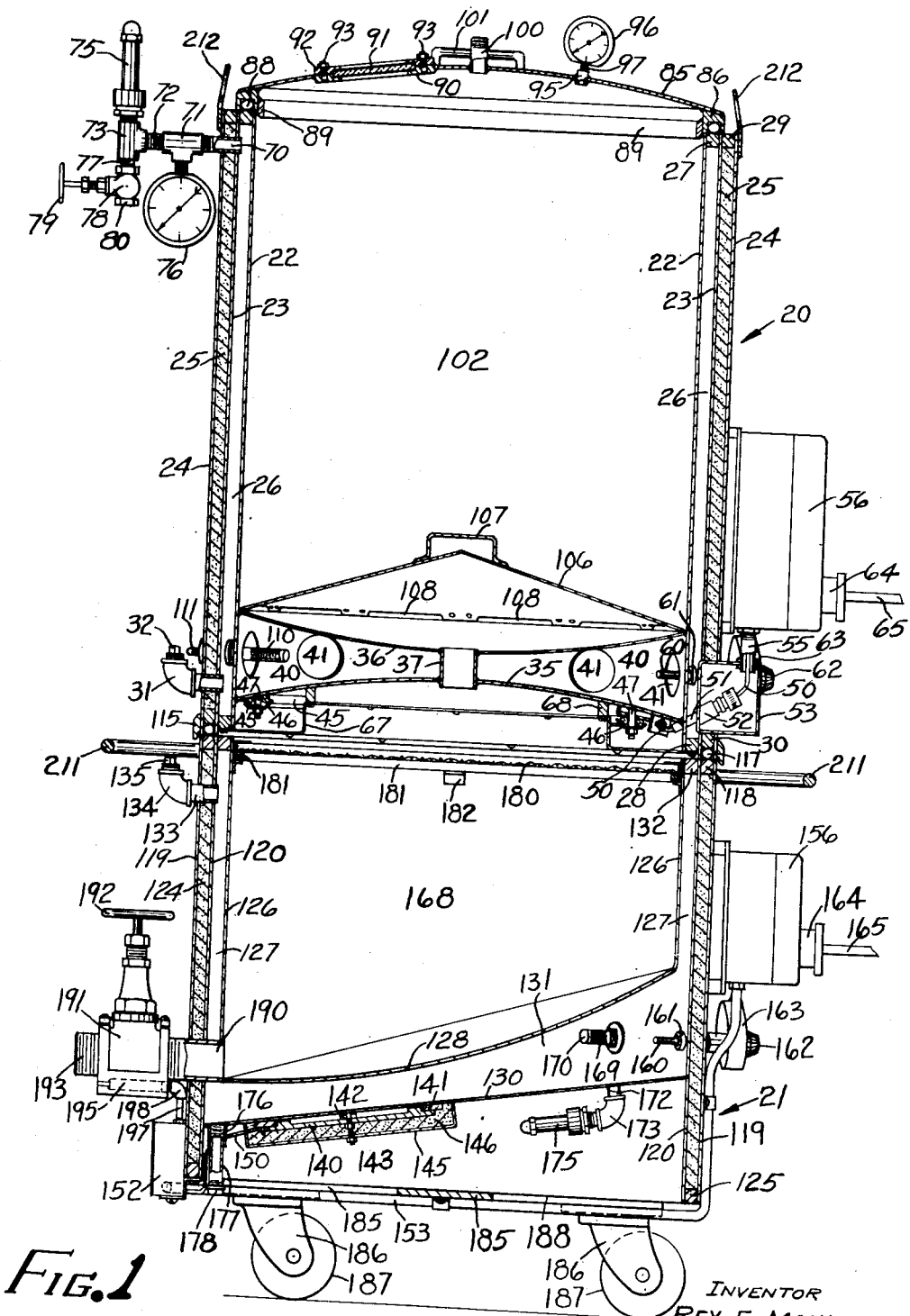

Referring first to Figure 1, the gelatin melter is indicated at 20 and the gelatin receiver is indicated at 21. The gelatin melter 20 comprises a large sheet metal cylinder 22 outside of which is a slightly larger sheet metal cylinder 23 outside of which is a still slightly larger sheet metal cylinder 24. These three cylinders 22, 23 and 24 are coaxial; between cylinders 22 and 23 is hot gas, as will be described, while between cylinders 23 and 24 is heat insulating material 25 which may be porous silica or any other suitable material. Thus this structure constitutes an insulated cylindrical container with a space 26 for heating fluid and the details of construction can be varied. Between the cylinders 22 and 23 at the top thereof is a sealing ring 27 and at the bottom thereof is another sealing ring 28. Similarly between the cylinders 23 and 24 at the top is a sealing ring 29 and at the bottom is a sealing ring 30. These rings 27, 28, 29 and 30 can be steel rings welded to the cylinders 22, 23 and 24 to make gas tight unions with the cylinders, especially to provide a hermetic seal between the cylinders 22 and 23. The sheet metal cylinders 22, 23 and 24 may likewise be made of steel.

I provide a filling pipe 31 with a plug 32 which can be used to charge the apparatus with water in the first instance (and for replacement after some has escaped). The plug 32 can be removed with a wrench.

Still referring to Figure 1, the bottom of the cylinder 22 is sealed by a sheet metal bottom 35 which may have the shape of a polar zone of a spherical surface. Just above the bottom 35 is a sheet metal secondary bottom 36 which may also have the shape of a polar zone of a spherical surface but which is placed convex side down while the bottom 35 is placed convex side up. The bottoms 35 and 36, which may also be made of steel, are welded to the inside of the cylinder 22 to form tight seals therewith. A short pipe 37 extends between holes centrally located in the bottoms 35 and 36 and is similarly welded to each. This construction therefore forms a receptacle with a hole in the bottom at the deepest point, together with a chamber 40 under the receptacle. Holes 41 through the cylinder 22 in the chamber 40 connect this chamber to the space 26 between the cylinders 22 and 23.

Still referring to Figure 1, under the sheet metal bottom 35 are electrical heating elements 45. As shown there are two of these heating elements 45 and they are supported by brackets 46 upheld by studs 47 welded to the underside of the bottom 35. These heating elements 45 may be of the type now almost universally used in currently manufactured domestic electric stoves, consisting of a resistance wire embedded in magnesia inside of a metal sheath. Such heating elements are well known and therefore need not be further described herein. They may be connected in series or in parallel; as shown a wire 50 leads from one terminal of a heating element through a spark plug casing 51 through the sheet metal cylinder 22 and into a conduit 52 in a sheet metal box 53, and there is likewise another wire, spark plug casing and conduit not shown to connect another terminal of one of the heating elements 45 to power. The wire 50 extends through a conduit 55 into another casing 56 secured to the outside of the cylinder 24 and likewise another terminal wire may lead through the same or an adjacent conduit not shown into the casing 56. In this casing 56 is electrical controlling apparatus responsive to a thermostat 60 extending through the outer cylinder 24 and through a gasket 61 in the cylinder 23 and through one of the holes 41 into the space 40. This thermostat 60 can be set by means of a knob 62 to any desired temperature and then the electrical apparatus in the box 56 will regulate the current through the heating elements 45 to keep the carbon tetrachloride or other substance gaseous or liquid in the space 40 at the indicated temperature. The electrical apparatus in the box 56 is connected by wires, not shown, to a junction box 63 through which the thermostat 60 extends. Electrical power is supplied to this apparatus by means of a plug 64 on the end of a cable 65. It is not necessary for me to describe the electrical regulating apparatus in the box 56 since this is per se not part of my invention and is well known in the arts generally nor do further details of the connections to the heaters 45 need to be described since these heaters may be connected to power in series or in parallel and any electrician knows how to do this. The heating elements 45 and supporting brackets 46 and various connections may be enclosed in an annular box-like structure 67 in the form of a piece of sheet metal extending from the ring 28 to a ring 68 welded to the underside of the bottom 35.

When water is poured into the space 26 and into the chamber 40 through the filling pipe 31 and the heating elements 45 are energized it will boil at a temperature depending upon the pressure.

Extending through holes in the cylinders 23 and 24 to the space 26 is a pipe 70 connected to a T-union 71 to which is connected a pipe 72 connected to a T-union 73 to which is connected a safety valve 75. Connected to the T-union 71 is a gauge 76 while connected to the T-union 73 is a short pipe 77 connected to a valve 78 having a valve wheel 79 to open and close the valve. The outer end 80 of the valve 78 is internally threaded so that a pipe can readily be connected thereto.

As above stated, I charge the chamber 40 with water and of course this cannot be above the level of the orifice of the filling pipe 31. At all events, after filling the chamber 40 to the extent indicated, I open the valve 78 and turn on the heater which comprises the heating elements 45. This vaporizes the water and drives the air out of the space 26. This space 26 can be called a jacket space. Another satisfactory way to get rid of part of the air is by connecting a vacuum pump by means of a pipe to the outer end 80 to remove air from the space 26, which of course can be done without first heating the water. It will thus be seen that the electric heater located on the bottom of the gelatin melter will heat the entire inside wall of the gelatin melter by means of steam. While gelatin is being melted the water vapor or steam rises in the space 26 and condenses upon the wall 22 whereupon the water flows to the bottom. This provides circulation and insures the transfer of heat.

The safety valve 75 is usually set to operate at a pressure of about 30 pounds to the square inch, meaning about 30 pounds above atmospheric pressure which is close to 45 pounds per square inch absolute. This apparatus can be used to melt gelatin masses without setting the thermostat 60 above 100° C. These gelatin masses usually melt at between 35° C. and 40° C. but of course for efficient melting the temperature of the water vapor should be well above this range of temperatures.

I may remove enough air from the jacket space 26 to cause the water to boil at the desired temperature. This boiling point should be slightly below the temperature set by the thermostat 60 (for example about 2° C. below). When the water boils the pressure in the jacket space 26 is increased and therefore the entire charge of water is not vaporized but the jacket space 26 is saturated with steam.

Still referring to Figure 1, the gelatin melter 20 has a removable cover 85 which may be a domed piece of sheet steel welded to a steel ring 86 having on the bottom a groove in which is a rubber ring 88 and having welded to the ring 86 an inside ring 89 to seat the cover inside of the sheet metal cylinder 22. Secured in a hole in the cover 85 is a circular frame 90 receiving a glass window 91 which is held in place by a frame front 92 bolted to the frame 90 by bolts 93. Through this window 91 the inside of the melter 20 can be observed and a beam of light can be directed through the window 91 or if desired a second window can be provided through which to shine the light. A pipe fitting 95 is secured in a hole in the cover 85 and to this pipe fitting 95 is attached a gauge 96 by means of a short pipe 97. This gauge 96 registers the below atmospheric pressure in the gelatin melter 20, that is to say it registers zero when the pressure inside the melter 20 is the same as that outside and the needle moves as the pressure inside is lowered. A pipe nipple 100 is secured to and extends through the cover 85 and to this may be connected a flexible hose connected to an air pump to exhaust air from the inside of the melter 20. For convenience in handling the cover I provide one or more handles 101 welded thereto.

One of the difficulties encountered in melting gelatin heretofore is that it is so viscous that it entraps a great deal of air and gelatin having air entrapped therein has an unpredictable viscosity and sheet material cast therefrom has undesired pores. The gelatin melter of this invention is designed particularly for servicing encapsulating machines although it may be used for any other desired purpose. Modern encapsulating machines form sheets or ribbons of gelatin and two of such sheets are brought together whereupon mechanism forms capsules out of the gelatin and fills them with medicament or other filling material. If the capsule walls are porous the capsules will leak. Therefore it is highly desirable to avoid entrapping air in the gelatin as it is melted and it is also desirable to remove any air that may already be present in the grains of gelatin. I have found that gelatin of the desired viscosity containing little or no entrapped air can be quickly made by melting granular gelatin in the melter herein described by exhausting air from the chamber 102 which is the space above the bottom 36, inside of the cylinder 22 and under the cover 85. Satisfactory results are obtained by developing a vacuum which measures minus 14 pounds per square inch in places where the atmospheric pressure is about 14.7 pounds per square inch. This vacuum is easy to achieve with a good pump. The rubber ring 88 provides a good seal between the cover 85 and the ring 27 and the greater the vacuum the tighter the seal as will be clear.

As the gelatin melts, it flows downwardly through the short pipe 37 into a gelatin receiver 21. It will be noted that the orifice to this short pipe 37 is flush with the upwardly concave surface of the secondary bottom 36 and that the short pipe 37 is located in the middle of the false bottom 36 and at the lowest point thereof. This arrangement is so that practically every last bit of gelatin will eventually find its way into the receiver 21. But I have found that, if no further precautions are taken, aggregates of grains of gelatin practically seal the orifice to the short pipe 37 during the early stages of melting and this slows up the melting process because masses of conglomerated gelatin inside a pool of liquid gelatin melt but slowly whereas if the liquid phase, as fast as it is formed, is allowed to drain downwardly the remaining masses are more quickly melted. It is noted that gelatin, like glue, tends to agglomerate when heated. Accordingly I preferably provide a baffle 106 and this may be removable and desirably has a handle 107 for that purpose. The baffle 106 may, as shown, be a wide angle sheet metal cone having the otherwise circular bottom broken up by wide but shallow cut-outs 108. Thus the liquid phase gelatin as it forms is forced outwardly by gravity and the incline of the baffle 106 practically to the cylinder 22 and then flows through the cut-outs 108 down the concave surface of the secondary bottom 36 right to the short pipe 37 and therethrough into the receiver 21. It is practically impossible for unmelted agglomerations of gelatin to block all of the cut-outs 108 and hence no substantial pool of liquid gelatin forms at any time in the melter 20. Furthermore, as the gelatin melts the mass thereof finally is lowered to the level of the apex of the baffle 106 and from that time on the remaining masses gradually glide outwardly toward the cylinder 22 which is the source of the heat and thus the melting operation is completed in a remarkably short time.

I have found that with this apparatus I can melt 140 pounds of gelatin in one hour in a gelatin melter constructed in accordance with this invention which has an inside diameter of 26" and which is 28" high from the outside of the false bottom 36 to the top of the cylinder 22 if I initially create a vacuum in the chamber 102 to leave only about 1" of mercury pressure therein and if the temperature in the space 26 is 90° C. This is very fast melting and furthermore the gelatin is free from entrapped air and has a uniform viscosity.

If the gelatin to be melted has already been hydrolized to the desired extent it can be melted in the gelatin melter of this invention without the addition of any other substance. If, however, the gel strength needs reducing or for any other reason the gelatin needs hydrolizing or further hydrolizing, water can be added with the solid particles of gelatin and the melter will not only melt the gelatin but will also hydrolize it. The total capacity of a melter having the dimensions above stated is around 350 pounds.

In order to check on the performance of the thermostat 89 I preferably provide a metal well 110 extending through the cylinders 23 and 24 and sealed thereto and also extending through one of the holes 41 to the inside of the chamber 40. This well 110 has a closed inner end. A thermometer 111 may be inserted into this well 110 and withdrawn from time to time for reading.

The bottom of the melter 20 has a ring flange 115 for seating the melter on the receiver 21. The sealing ring 39 is spaced upwardly from the lower end of the cylinders 23 and 24 thus leaving an annular space between these cylinders at the bottom thereof and in this space is a rubber ring 117 which rests upon a sealing ring 118 which is welded to and connects sheet metal cylinders 119 and 120 which are concentric and form two walls of the receiver 21. The space between the cylinders 119 and 120 is preferably filled with heat insulating material 124 like the heat insulating material 25. The cylinders 119 and 120 are connected at the bottom by a sealing ring 125. Inside the cylinder 120 and concentric with it is a sheet metal cylinder 126 leaving a space 127 between the cylinders 120 and 126. This sheet metal cylinder 126 is truncated and an upwardly convex inclined bottom 128 is welded to it.

Below the bottom 128 is another metal bottom 130 which may be a flat, slightly elliptical piece of steel welded to the sheet metal cylinder 120. Between the bottoms 128 and 130 is a space 131 which is in communication with the space 127. The space 127 is sealed by a ring 132 welded to the cylinders 120 and 126. Extending through holes in the cylinders 119 and 120 to the space 127 is a pipe 133 connected to an elbow 134 having a plug 135 which can be removed with a wrench. Through this elbow 134 and pipe 133 water can be introduced into the spaces 127 and 131 and in operation these spaces are usually filled to about the level of the top of the elbow 134.

Secured to the underside of the metal bottom 130 by means of a clamp 140 is a heating element 141 of circular shape. This element 141 may be of the same type of electrical heating element as the elements 45. The clamp 140 is removably held in position by means of a stud 142 welded to the underside of the bottom 130. This stud 142 and a nut 143 thereon also removably hold a metal box 145 around the element 141 and clamp 140, and in the metal box 145 is asbestos insulation 146. A wire 150 is connected to one end of the heating element 141 and another wire not shown is connected to the other end thereof. These wires lead to a junction box 152 which is connected by a pipe 153 to a casing 156 which, like the casing 56, contains electrical controlling apparatus responsive to a thermostat 160 of the same kind as the thermostat 60. This thermostat 160 extends through the outer cylinder 119 and through a gasket 161 in the cylinder 120 and into the space 131. This thermostat 160 can be set by means of a knob 162 to any desired temperature and then the electrical apparatus in the box 156 will regulate the current through the heating element 141 to keep the water or other liquid in the spaces 131 and 127 at the indicated temperature. The electrical regulating apparatus in the box 156 may be a substantial duplicate of that in the box 56 and is connected by wires, not shown, to a junction box 163 through which the thermostat 160 extends. Electrical power is supplied to this apparatus by means of a plug 164 on the end of a cable 165. The pipe 153 connecting the casing 156 with the junction box 152 of course contains electric wires.

In this manner the gelatin receiving chamber 168 formed by the cylinder 126 and bottom 128 may be kept at any desired temperature which can be checked from time to time by means of a removable thermometer 169 in a well 170 like the well 110. This well 170 extends through the cylinders 119 and 120 into the space 131. Connected by means of a short pipe 172 and an elbow 173 to the space 131 is a safety valve 175 which can be set to open at any desired pressure for example at a gauge pressure of 30 pounds per square inch.

In order to drain the spaces 127 and 131 from time to time an internally threaded socket 176 is welded to the underside of the bottom 130 surrounding a hole through the bottom and into this socket 176 is screwed a pipe 177 on the bottom of which is a removable plug 178. The water in the tank formed by the spaces 127 and 131 is customarily kept at a temperature of about 135° F. so that the gelatin in the receiving chamber 168 will be at or slightly under this temperature.

I further preferably provide a screen 180 secured to an annular frame 181 removably resting upon lugs 182 welded to the inside of the cylinder 126 in order to exclude splinters of wood or any other dirt or undesired substance from the receiving chamber 168. The entire receiver 21 has bottom plates 185 secured to the undersides of the cylinders 119 and 120 and the ring 125 and to some of these plates 185 are pivotally secured swivelling casters 186 having wheels 187, there being preferably four casters and wheels. Thus the receiver 21 can readily be moved from place to place. The bottom plates 185 do not cover all of the area enclosed by the cylinder 120, instead access openings 188 are left for access to the safety valve 175, the box 145 and the heating element 141 contained therein.

Extending through the cylinders 119, 120 and 126 and welded thereto is a pipe 190 to which is connected a large valve 191 operated by a valve wheel 192 and having a threaded connection 193. Through this valve 191 gelatin can be delivered as desired. This valve 191 is heated by a cartridge heater 195 adjacent thereto which is connected by wires to the junction box 152 the wires being contained in a pipe 197 and elbow 198.

Figure 2:
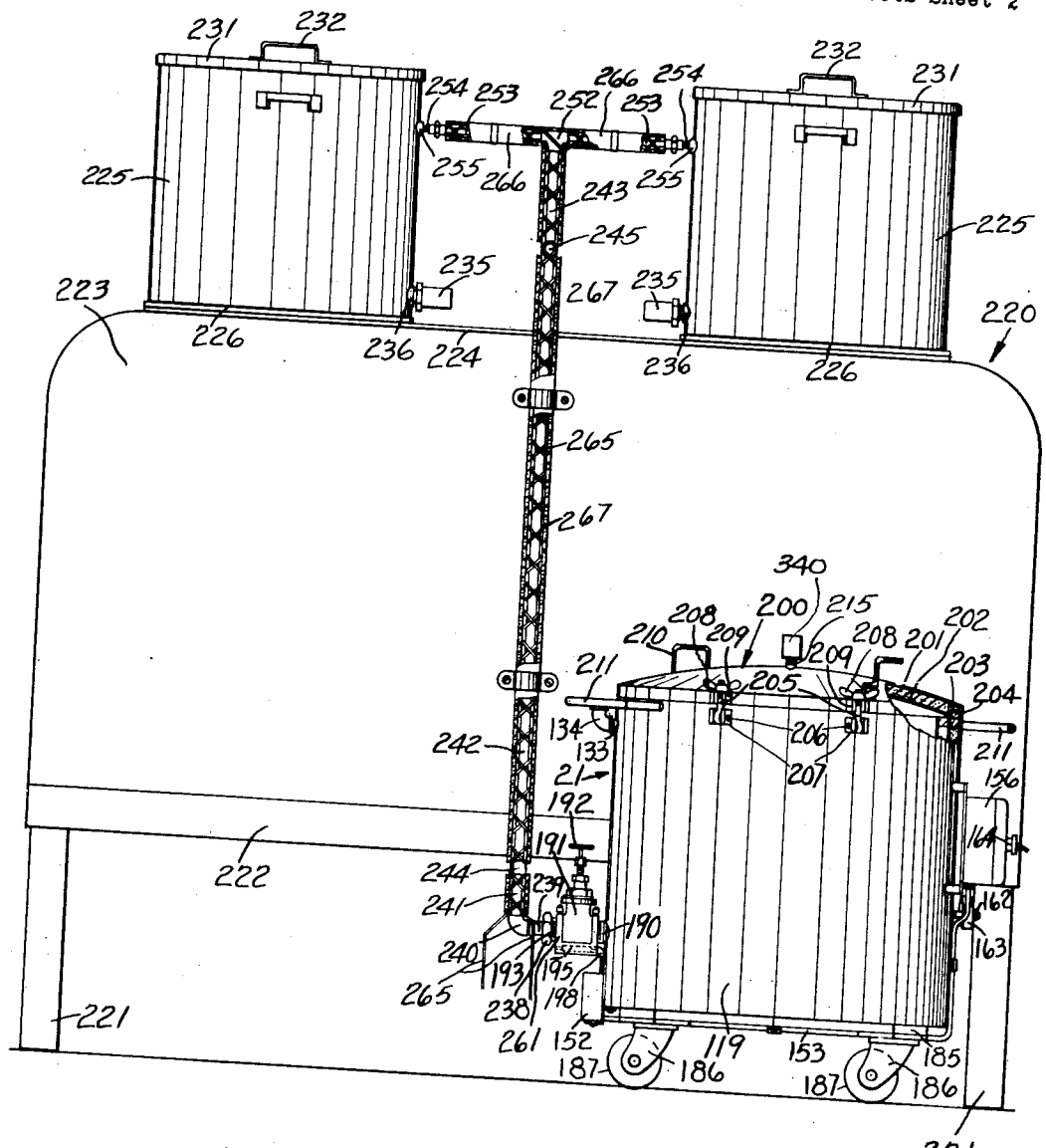
Figure 2 is a rear elevation of an encapsulating machine showing merely the frame thereof together with a pair of gelatin tanks on the top of the encapsulating machine, a gelatin receiver constructed according to the present invention and illustrating connections for transferring the gelatin from the receiver to the tanks.

Referring now to Figure 2, the gelatin receiver 21 is shown with the melter 20 removed. Instead the receiver 21 is capped by a cover 200 comprising an upper domed piece of sheet metal 201 and a lower domed piece of sheet metal 202 connected by and welded to a ring 203 having a groove on the underside filled with a rubber ring 204. Ring bolts 205 mounted on pins 206 between ears 207 and having wing nuts 208 are received in slotted members 209 to secure the cover 200 tightly to the receiver 21, the ears 207 being welded to the outside of the receiver 21 and the slotted members 209 being welded to the edge of the cover 200. The cover 200 has handles 210 and the receiver 21 also has handles 211. Similarly the melter 20 has handles 212. Extending through the pieces of sheet metal 201 and 202 from the inside to the outside of the cover 200 is a threaded nipple 215 by means of which the chamber 168 can be connected to a source of air under pressure. In this way the molten gelatin in the receiving chamber 168 can be forced out through the valve 191 as desired.

Figure 3:
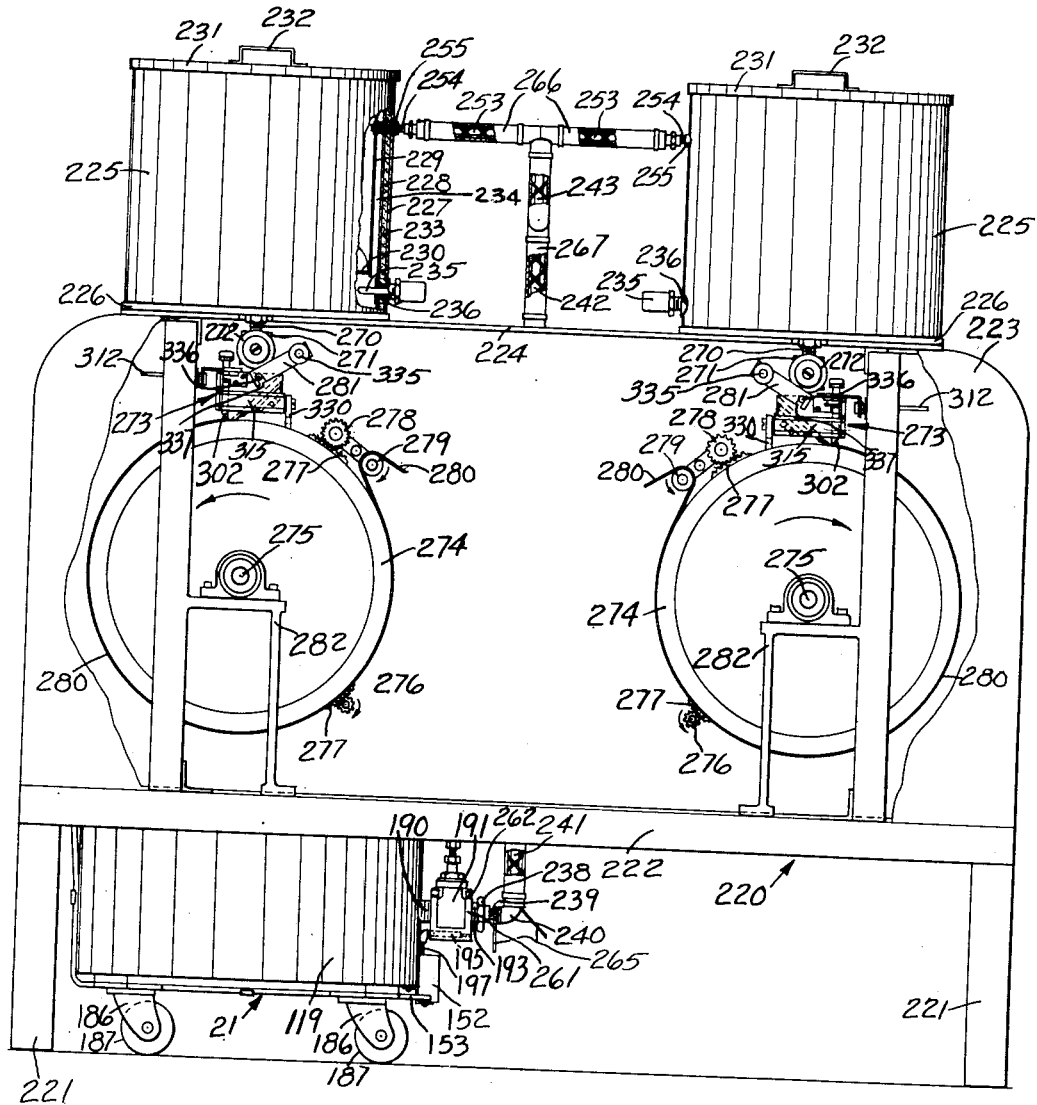
Figure 3 is a front elevation of the encapsulating machine showing the casting cylinders and spreader boxes and the gelatin receiver connected to the gelatin tanks as in Figure 2.

The receiver 21 is shown standing in the rear of an encapsulating machine 220 having legs 221, a bottom frame member 222 like a platform, an upright frame member 223 like a panel and a top frame member 224 like a platform. Gelatin tanks 225 are supported by the platform 224. Referring now to Figure 3, each gelatin tank comprises a bottom 226, three concentric cylinders 227, 228 and 229, an inside bottom 230, and a cover 231 which is removable and has a handle 232. The space between the cylinders 227 and 228 is filled with insulating material 233 which may be porous silica. There is a space 234 between the cylinders 228 and 229 and between the bottoms 226 and 230 which is filled with water or other suitable fluid which is heated by an electric heater 235 extending through a ring 236 that extends through the cylinders 227 and 228.

Referring now to Figures 2 and 3, a coupling 238 connects the valve 191 to a short pipe 239 which is connected to an elbow 240 which is connected to a vertical pipe 241 which is connected to piping including vertical pipes 242 and 243, elbows 244 and 245 and short horizontal pipes not shown and at the top thereof to a T union 252 which is connected to horizontal pipes 253 which are connected to short pipe 254 that extend through short pipes 255 which extend through and are welded to the cylinders 227, 228 and 229. It will now be seen that when the wheel 192 is turned to open the valve 191, provided there is pressure in the chamber 168, liquid gelatin will flow up the pipes 241, 242 and 243 and through pipes 253 and 254 into the gelatin tanks 225. There will be no back pressure opposing this flow because the covers 231 are not tight.

Figure 4:
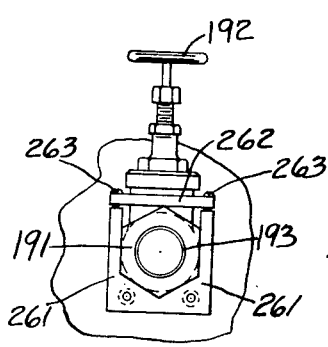
Figure 4 is an elevation of a valve connected to the gelatin tank showing means for heating it.

I provide means to heat the pipes 241, 242, 243 and 253 as well as the valve 191 in order that the gelatin shall not congeal therein. The cartridge heater 195 is embedded in a U-shaped casting 261 which is U-shaped as seen from the side and also from the front as illustrated in Figures 1 and 4. This casting 261 is clamped to the valve 191 by means of cross bars 262 and screws 263 as shown and the heat readily flows from casting 261 into the metal of the valve 191 and keeps the gelatin from congealing therein. Referring especially to Figure 2, a resistance wire 265 is wound around the horizontal pipes 253 and then down around the piping comprising pipes 243, 242 and 241 and electric current is passed through this wire heating all of this piping. Sheaths of insulation 266 are placed over the pipes 243 and wire 265 and sheaths of insulation 267 are placed over the piping including the vertical pipes 241, 242 and 243 as well as the horizontal pipes not shown that connect them and of course enclosing the resistance wire 265. In this manner this whole system of piping is kept warm so that the gelatin will not congeal therein. If these precautions were not taken the gelatin would be apt to freeze in the piping because piping readily radiates heat.

Referring now to Figure 3, liquid gelatin is delivered from the gelatin tanks 225 by vertical pipes 270 which extend through the bottoms 226 and 230, into valves 271 having hand wheels 272. When the valves 271 are opened gelatin flows into spreader boxes 273 which deposit the liquid gelatin upon casting wheels 274. The features of the spreader boxes 273 will be described more in detail hereinafter in connection with the modification of Figure 5, these spreader boxes being illustrated in enlarged scale in Figures 6 and 7. The casting wheels 274 are kept cool in any suitable manner and revolve in the directions shown by the arrows being mounted upon axles 275. These casting wheels 274 may be driven in any suitable manner; as herein shown pinion gears 276 engage gear teeth 277 formed on one side of the periphery of the casting drums, these pinion gears 276 being driven in any suitable manner. The gear teeth 277 engage pinions 278 which drive rollers 279 by means of belts and pulleys not shown thereby to pick off the ribbons 280 of congealed gelatin deliverying these ribbons 280 to encapsulating apparatus not shown herein since it forms no part of the present invention. The spreader boxes 273 rest upon the casting wheels 274 but are prevented from moving with it by means of arms 281. The axles 275 for the casting wheels are supported by frame pieces 282 secured to the platforms 222 and 224.

The apparatus of this invention functions to produce high grade ribbons of gelatin 280 for the production of perfect capsules because the gelatin is melted without entrapping any air and is kept at a high enough temperature so that it will flow freely until it reaches the casting drums 274 whereupon it is quickly congealed to form the ribbons. Accordingly the apparatus of this invention greatly facilitates the manufacture of perfect capsules by automatic encapsulating mechanism. Furthermore this apparatus can be easily operated and controlled and readily moved from one place to another in order that the gelatin may be melted in one room and the encapsulating done in another room. This is especially important since the encapsulating room should be air-conditioned and cool. Only the receiver 21 needs to be moved into the encapsulating room and the melter 20 can remain in the melting room. Movement of the melter and receiver is no problem because there are no steam pipes connected to either. The electric cables 65 and 165 can be long cables having plugs at the other ends so that they can be connected to power wherever there is a wall socket. Modern factories have compressed air systems connected to piping to which hoses can be quickly attached and thus subjecting the chamber 103 to pressure is no problem. Similarly the provision of piping to connect the nipple 190 to a source of vacuum presents little difficulty. The valve 191 can be quickly attached to and detached from the pipe 239 by the coupling 238. Thus an encapsulating machine can be readily and efficiently serviced by this apparatus and there is no difficulty about spilling gelatin as when using pails to fill the gelatin tanks 225.

Figure 5:
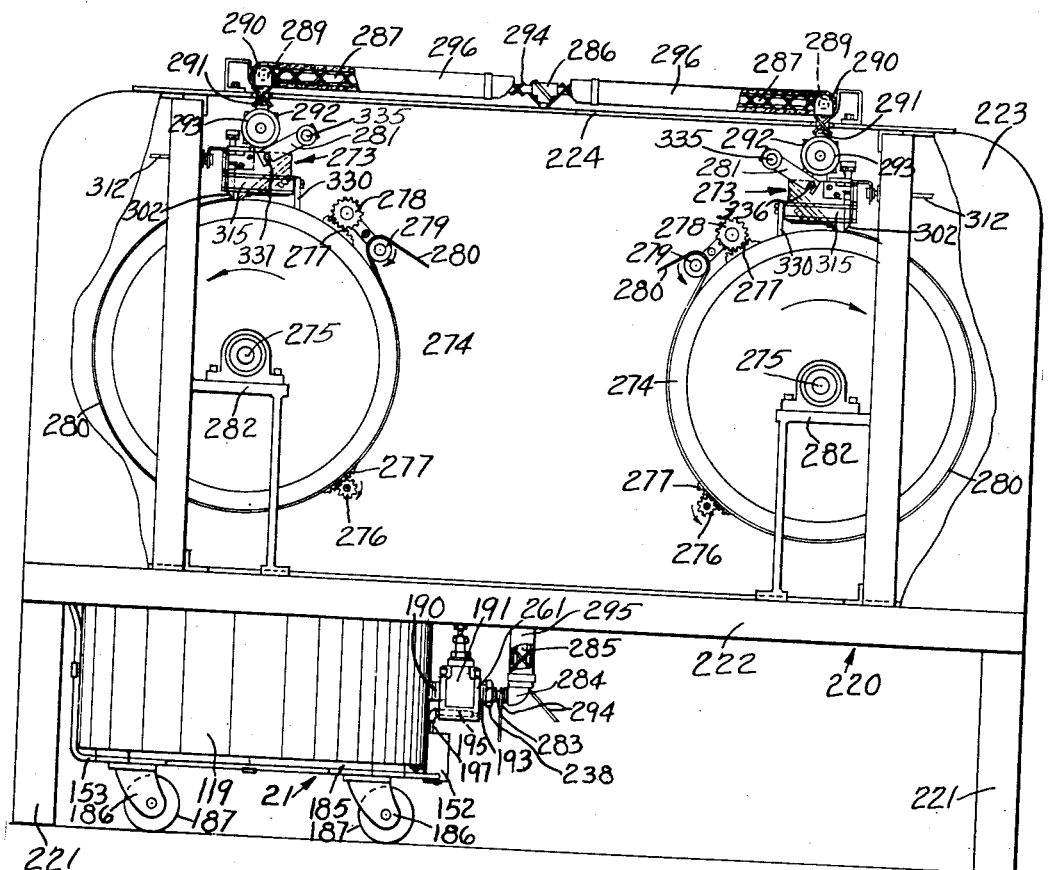
Figure 5 is a front elevation similar to Figure 3, but illustrating a modification of the invention in which the connections extend directly from the gelatin receiver to the spreader boxes thus eliminating the gelatin tanks on the encapsulating machine.
Figure 7:
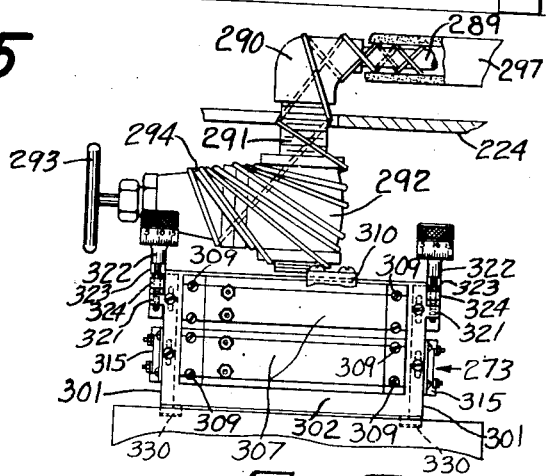
Figure 7 is a side elevation, on the same scale as Figure 6, of the spreader box illustrating also the pipe connection for transmitting gelatin from the receiver.

Referring now to Figure 5, the gelatin receiver 21 is shown connected directly to the spreader boxes 273 thus eliminating the gelatin tanks 225. As shown, the coupling 238 is connected to a short pipe 283 which is connected to an elbow 284 which is connected to a vertical pipe 285 which is connected to a T union 286 which is connected to horizontal pipes 287, which are connected to elbows not shown, which are connected to forwardly extending horizontal pipes 289 one of which is shown in Figure 7, which are connected to elbows 290 which are connected to vertical pipes 291 which are connected to valves 292 operated by hand wheels 293. An electric resistance wire 294 is wound around all of this piping including the valves 292 and thus they are all kept warm. Sheaths of insulation 295, 296 and 297 cover this piping and the wire 294 and keep the gelatin at the same temperature as it travels from the receiver 21 to the spreader boxes 273. Thus the gelatin cannot congeal and neither does its viscosity change.

Figure 6:
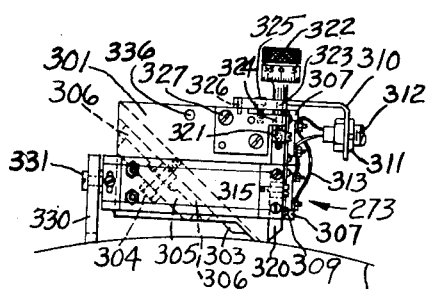
Figure 6 is a front elevation of one of the spreader boxes on an enlarged scale as compared with Figure 5.

Referring now to Figures 6 and 7, each spreader box 273 comprises end walls 301, a doctor 302 and a combined back and bottom wall 303 which is inclined as shown. A bolt 304 holds a clamp 305 to clamp heaters 306 against the combined back and bottom 303. A pair of heaters 307 are clamped to the doctor 302 by means of screws 309. Arms 310 attached to the top of the spreader boxes 273 hold fittings 311 on the ends of conduits 312 in which is electric wire 313 to energize the heaters. There are also heaters 315 secured by screws 316 to the end walls 301. Thus it will be seen that the spreader boxes 273 are kept warm and gelatin cannot congeal therein. The gelatin is spread upon the cylinders 274 by the doctors 302 having lugs 321 into which extend adjusting screws 322 that are held by thrust members 323 and 324, the former being connected to the latter by a screw 325 and pinion 326 and the latter being secured by screws 327 to the end walls 301. Thus either end of the doctor 302 can be raised or lowered relative to the casting wheel 274 and the adjustment is a fine one. In this manner the thickness of the gelatin ribbon 280 can be regulated. The spreader boxes have legs 330 (two for each box) which rest on the casting wheels, these legs 330 being attached to the spreader boxes by means of screws 331. As already explained the arms 281 prevent the spreader boxes from moving with the casting wheels 274. There are two arms 281 for each box 273, one at each end thereof and the arms 281 are mounted on shafts 335 attached to and projecting from the panel 223. Pins 336 on the boxes 273 engage slots 337 in the arms 281 to hold the boxes to the arms and therefore the boxes 273 can easily be removed from the machine for cleaning.

The apparatus herein described is apparatus for conditioning gelatin and delivering it to an encapsulating machine in good condition for making perfect capsules. By conditioning I not only mean melting but also removing any air in the gelatin and preventing any additional air from being entrapped in the gelatin. As pointed out hereinbefore the melter 20 is an efficient melter since the liquid drains off as fast as it is formed and the provision of the baffle 106 prevents the short pipe 37 which is the exit orifice of the melter from being blocked with agglomerations of gelatin which otherwise would occur. As the liquid is formed, it pours through the short pipe 37 and starts to fill the gelatin receiving chamber 168. It will be noticed that by the evacuation of air from the chamber 102 air is also evacuated from the chamber 168 because the short pipe 37 connects these chambers while the rubber ring 117 seals the melter to the receiver. As the pressure in the chambers 102 and 168 drops, the melter 20 is held tighter and tighter to the receiver 21 so there is no danger of leakage of air into the combination melter-receiver. It is understood, of course, that the pipe nipple 100 is connected to piping having a check valve therein which in turn is connected to an exhaust pump. Somewhere in this line is a control valve to readmit the air into the chambers 102 and 168 and this control valve is manipulated whenever the load of gelatin in the melter 102 has been completely melted and is now in liquid form in the chamber 168. When this occurs can easily be observed by observation through the glass window 91. Then, air having been readmitted into the chambers 102 and 168, the melter 20 can readily be lifted from the receiver 21 and the cover 200 can be clamped upon the receiver 21 and air can be pumped into the receiver through the threaded nipple 215. Again it is to be understood that this threaded nipple 215 is to be connected to flexible piping having a check valve and a suitable hand controlled valve and an air pump and most modern factories have such equipment readily available, there being piping in the walls, pressure pumps as well as exhaust pumps located at some remote place but connected to the piping throughout the building. It is, however, desirable to have a fitting 340 on the nipple 215 containing a check valve to allow the air to be forced into the receiver 21 but not to exhaust therefrom. By the provision of this fitting 340 to which in turn the air hose is connected, the air pressure in the chamber 168 will be maintained even when the hose is disconnected and this will permit the receiver 21 to be moved into the encapsulating room without dragging a lot of hose behind it. It is of course easy to let the air out of the receiver 21 at any time insomuch as this may be done by loosening one or more of the wing nuts 208. While they are tight, however, the cover 200 is hermetically sealed to the receiver 21 by means of the rubber ring 204. This rubber ring 204 may be the same as the ring 117 or it may be a different ring.

The heating of the chamber 102 takes place by a reflux condenser action. It will be seen from the level of the filling pipe 31 that there is never a great deal of liquid in the chamber 40 which is in effect part of the jacket which includes the jacket space 26 between the walls 22 and 23 which may be sheet metal cylinders as described. As the liquid vaporizes it condenses on the wall 22 and then trickles down this wall into the pool in the jacket chamber 40. This reflux condenser action facilitates the fast delivery of heat from the electrical heating elements 45 to the charge in the chamber 102. On the other hand, it is more important that the receiver 21 have and retain a large quantity of heat as measured in calories or British thermal units. Consequently the jacket space 127 between the walls 129 and 126 is substantially filled with liquid as will be seen by the level of the filling pipe 133, 134. Any liquid at a given temperature has more heat units therein for a given volume than any gas at the same temperature.

The heating units for both the melter and the receiver are located outside of the liquid so that they will not deteriorate and at the same time are conveniently accessible for renewal or repair. However they are located in contact with the bottom of the melter and receiver respectively and above this bottom is the liquid which is to be heated in each case while the jacket of the melter is heated by a reflux condenser action and the jacket of the receiver is heated by convection flow in the liquid. The receiver, having a large quantity of hot water in the jacket, holds a large quantity of British thermal units of heat. If it is desired to cool the receiver, cold water can be added to its jacket.

The concentric cylinder construction of the walls of the melter and the receiver gives considerable strength to resist the mechanical forces due to evacuation of air from the chambers 102 and 168 and to resist the mechanical forces due to the pumping of air into the chamber 168. Furthermore the removable cover 85 is domed, that is to say it has the shape of a polar zone of a spherical surface, and this shape also resists mechanical force due to evacuation of air. It will be noted also that the bottom 128 has the shape of a polar zone of a spherical surface. The combination of a cylinder and a pair of polar zones makes a mechanically strong container. Furthermore the jacket space comprising the spaces 26 and 40 may sometimes be under considerable pressure perhaps due to overheating by the heating elements 45, but the polar zone shape of the bottoms 35 and 36 and their arrangement, convex sides towards each other, give great strength to the jacket construction as also does the cylindrical shape of the walls 22 and 23. By providing a geometry to give great strength I can reduce the amount of metal in the parts thus to provide a light weight melter and a light weight receiver.

One advantage of the apparatus of this invention is that gelatin can be quickly hydrolized and "aged" in that by charging the chamber 102 with gelatin containing water and glycerine or other plasticizer, and heating, as described, the gelatin can be used as soon as it has been collected in the receiver 21, which could not heretofore be done with certain raw gelatins which had not been aged for several days. This is due to the provisions for creating a vacuum, heating to the relatively high temperatures indicated (high for gelatin) and the quick withdrawal of the hydrolized melt.

With regard to the vacuum in the chamber 102, I have found it good practice to employ a vacuum down to one inch of mercury absolute but good and practical results can be achieved if the vacuum is as good as five inches of mercury absolute. Gelatin treated in accordance with my invention having been cooked and having had the air extracted makes strong impervious capsules and permits an automatic encapsulating machine to operate continuously without breakdown whereas gelatin not so treated frequently makes inferior capsules.

It will thus be seen that there has been provided by this invention apparatus in which the various objects hereinabove set forth together with many thoroughly practical advantages are successfully achieved. As various possible embodiments might be made of the mechanical features of the above invention without departing from the scope of the invention, it is to be understood that all matter hereinbefore set forth or shown in the accompanying drawings is to be interpreted as illustrative and not in a limiting sense.

I claim:

1. A gelatin melter comprising three cylindrical coaxial walls having two sealed spaces therebetween and the inside wall forming a container, two spherical polar zone sheet members inside the container at the bottom thereof and being affixed along their peripheries to said inside wall so as to provide a bottom and a secondary bottom to the container, the lower of said spherical polar zone sheet members which forms the container bottom being located concave side down and the upper thereof which forms the secondary bottom being located concave side up and there being a space sealed between them in communication with the sealed space between the intermediate and the inner coaxial walls, a discharge orifice through said spherical polar zone sheet members at the poles thereof and an upright conical baffle member in said container disposed immediately above said secondary bottom and extending substantially to the inside wall of the container, said baffle member being provided along its periphery with a plurality of shallow cut-outs, said baffle member and its peripheral-edge cut-outs causing the melted gelatin to flow outwardly on to the peripheral portion of said secondary bottom and the upward concavity of the latter causing the melted gelatin to flow inwardly to said discharge orifice.

2. A gelatin melter as claimed in claim 1 in which the baffle member is removably supported on the secondary bottom.

3. Apparatus for servicing an encapsulating machine or the like comprising a gelatin melter having outer and inner coaxial cylindrical walls and a double bottom defining a cylindrical space into which the gelatin can be put, said double bottom comprising a lower downwardly concave bottom member and an upper upwardly concave secondary bottom member, said members being axially spaced and sealed along their peripheries to the inner cylindrical wall and connected by a centrally disposed pipe for the discharge of melted gelatin, said coaxial walls and said double bottom providing respectively a peripheral cylindrical shell space and a communicating bottom space to receive heating fluid, there being an upright conical baffle member disposed in said cylindrical space immediately above and removably supported on said secondary bottom member, said baffle member extending substantially to the inner cylindrical wall and being provided along its peripheral edge with a plurality of shallow cut-outs providing for passage of melted gelatin from the cylindrical shell space to the outer region of said secondary bottom member and thence inwardly therealong to said discharge pipe, a pipe with a shut-off valve extending through the outer of said coaxial walls to the peripheral cylindrical shell space for the evacuation of air from said space, an electric heater under but close to said double bottom whereby the bottom space can be charged with water and the melter can be heated with a reflux condenser action, and a wheeled gelatin receiving receiver for receiving melted gelatin discharging from the melter through said discharge pipe and being shaped so that said melter will fit thereon and having detachable sealing means for sealing the melter to the receiver along their respective lower and upper edges, said receiver having a pair of coaxial cylindrical walls and a double bottom defining a cylindrical space into which the melted gelatin can be received, a peripheral cylindrical shell space and a bottom space to receive heating liquid, an electric heater under but close to said double bottom and a filling connection from the outside to the peripheral cylindrical shell space near the top thereof so that the receiver can be kept hot by a large volume of hot liquid introduced through said filling connection into said peripheral cylindrical shell space and said bottom space.

References Cited in the file of this patent
UNITED STATES PATENTS

| Number | Name | Date |
|---|---|---|
| 1,009,616 | Zimmerman | Nov. 21, 1911 |
| 1,691,903 | Mortimer | Nov. 13, 1928 |
| 1,738,908 | Kuhn et al. | Dec. 10, 1929 |
| 1,892,599 | Atherton | Dec. 27, 1932 |
| 1,980,696 | Rabate et al. | Nov. 13, 1934 |
| 2,231,506 | Morey | Feb. 11, 1941 |
| 2,275,654 | Ravenscroft | Mar. 10, 1942 |
| 2,292,022 | Christopher | Aug. 4, 1942 |
| 2,533,964 | Scherer | Dec. 12, 1950 |